July 26, 1966 W. I. NISSEN 3,262,337
METHOD OF GUIDING A RIBBON-LIKE SHAVING BLADE THROUGH A MAGAZINE
Original Filed July 1, 1963 7 Sheets-Sheet 2

INVENTOR.
WARREN I. NISSEN
BY
Miketta and Glenny
ATTORNEYS

United States Patent Office 3,262,337
Patented July 26, 1966

3,262,337
METHOD OF GUIDING A RIBBON-LIKE SHAVING BLADE THROUGH A MAGAZINE
Warren I. Nissen, Topsfield, Mass., assignor to The Gillette Company, Boston, Mass., a corporation of Delaware
Continuation of abandoned application Ser. No. 485,136, July 6, 1965, which is a division of application Ser. No. 305,734, July 1, 1963. This application Mar. 4, 1966, Ser. No. 536,562
4 Claims. (Cl. 76—101)

This is a continuation of applicant's prior co-pending application Serial No. 485,136, filed July 6, 1965, now abandoned, which is a divisional application of applicant's application Serial No. 305,734, filed July 1, 1963, now abandoned, which is a continuation-in-part of applicant's application Serial No. 211,073, filed July 19, 1962, now abandoned.

The present invention relates to a method of effectively guiding a ribbon-like shaving blade of uniform width through a shaving zone of a magazine adapted to be placed in a holder, so as to maintain the unsharpened rear edge of the blade at all times against an abutment surface associated with the shaving zone while maintaining major sections of the ribbon-like blade restrained in supply and take-up zones. The magazine is adapted to be removably carried in a holder to provide a safety razor.

Attempts have been made heretofore directed to the development of safety razors utilizing a ribbon-like or strip shaving blade, such a blade having an unsharpened rear edge and a parallel sharpened edge. Such safety razors included a magazine having a supply of ribbon-like blade, generally coiled, a rotatable blade take-up means, and a blade supporting surface for receiving and supporting a length of such blade for shaving. However, because of the many problems involved, there have been no commercially successful razors provided with removable magazines having a continuous ribbon-like blade which is adapted to have successive lengths thereof rendered available for shaving.

Generally, the problems involved in developing such a commercially acceptable safety razor were associated with the magazine containing the ribbon-like shaving blade. There was difficulty in preventing the blade from moving laterally during advancement of the blade. The location and position of that portion of the blade exposed for use in shaving was not effective and often unsatisfactory. Although a razor should be small and compact, it should present a relatively long shaving edge in order to expedite shaving. The ends of that portion of the ribbon-like blade in the shaving zone of prior magazines had a large radius of curvtaure, and since these curved sections were not effective in shaving, the intermediate shaving portion was spaced from the sides of the magazine and hence from the sides of a holder receiving such magazine to an undesirable extent. The prior magazines of this type were not capable of presenting shaving blade sections so as to permit shaving in normally inaccessible or recessed areas, such as in clefts, around nostrils, ears, etc.

It was recognized that the supply of ribbon-like blade in the magazine should be provided in a coiled condition for ease of handling and most effective use. However, there were problems in providing effective and operable means for receiving such a coiled supply of a ribbon-like blade in the magazine and preventing the coiled blade from moving laterally within the magazine when a length of blade was advanced from the coiled supply to the shaving zone of the magazine. Such uncontrolled lateral movement, in prior magazines, either tended to move the sharpened blade against a dulling surface or produced undesirable variations in blade exposure and shaving effectiveness.

The magazine for a ribbon-like shaving blade of the present invention completely obviates the problems encountered heretofore in developing a commercially acceptable safety razor having ribbon-like blade and is arranged to produce new and desirable effects and results. The present magazine is adapted to be removably carried by a holder to provide a safety razor having a continuous ribbon-like shaving blade wherein successive lengths of such blade may be rendered available for shaving. Such magazine includes means for imparting when clamped in the holder a frusto-conical form to a portion of a ribbon-like blade at each end of such blade length of the shaving zone wherein the apex of each such frusto-conical portion is lying forwardly of the sharpened edge of such blade. Such frusto-conical end portions are of small radius, thus making it possible to shave those shielded or recessed areas which were normally inaccessible to ribbon type safety razors attempted to be developed heretofore.

Moreover, the magazine of the present invention includes a portion defining a shaving zone for a length of the blade and spaced, supporting pads for continuously engaging the rear unsharpened edge of the blade to provide a positive backstop for the blade in the shaving zone. This together with the operation of the frusto-conical forms insures positive and desired blade edge exposure and location.

A further improvement characterizing the present invention is the provision of self-adjusting blade take-up means which is rotatably and loosely mounted within the magazine and which is adapted to reduce the clamping pressure on the ribbon-like blade as the blade is advanced when the magazine is removably carried in a holder of a safety razor.

Accordingly, it is a general object of the present invention to provide a magazine for a ribbon-like blade that avoids all of the foregoing disadvantages of such magazines heretofore proposed by others.

An object of the present invention is a method of effectively guiding a ribbon-like shaving blade through a shaving zone of a magazine adapted to be placed in a holder.

A further object of the present invention is a method of effectively guiding a ribbon-like shaving blade through a shaving zone of a magazine adapted to be placed in a holder, so as to maintain the unsharpened rear edge of the blade at all times against an abutment surface associated with the shaving zone while maintaining major sections of the blade restrained in supply and take-up zones.

Other objects and advantages of this invention will be readily apparent from the following description which is primarily directed to exemplary forms illustrated in the appended drawings.

In the drawings.

FIG. 5 is an enlarged vertical section of the device taken along plane V—V of FIG. 4.

Figure 1:
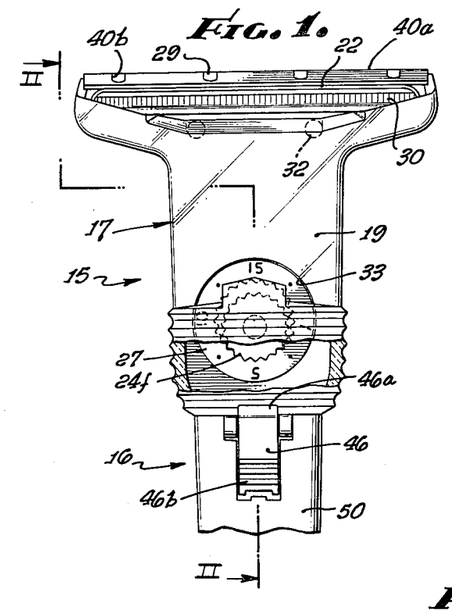
FIG. 1 is a front elevation of an exemplary magazine device of the present invention removably carried by a holder to form a safety razor of unusual attributes. A portion of the cover is broken away.
Figure 2:
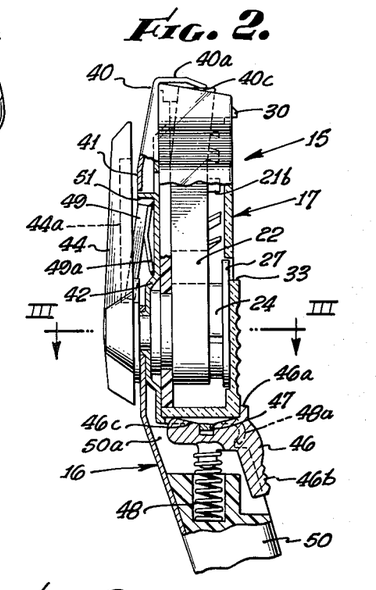
FIG. 2 is a side elevation, partly in vertical section, of the device, the section and view being taken along plane II—II of FIG. 1.
Figure 3:
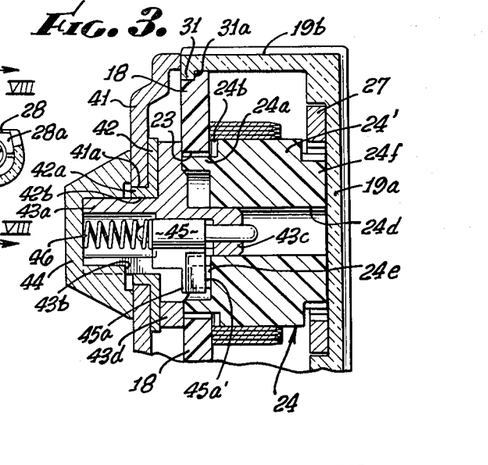
FIG. 3 is an enlarged transverse section of the device taken along plane III—III of FIG. 2.

Referring now to the drawings, wherein like reference characters designate like or corresponding parts throughout the several views, there is shown in FIGS. 1, 2 and 3 a safety razor 15 including a holder 16 and an exemplary magazine 17 of the present invention removably carried by the holder 16.

Figure 11:
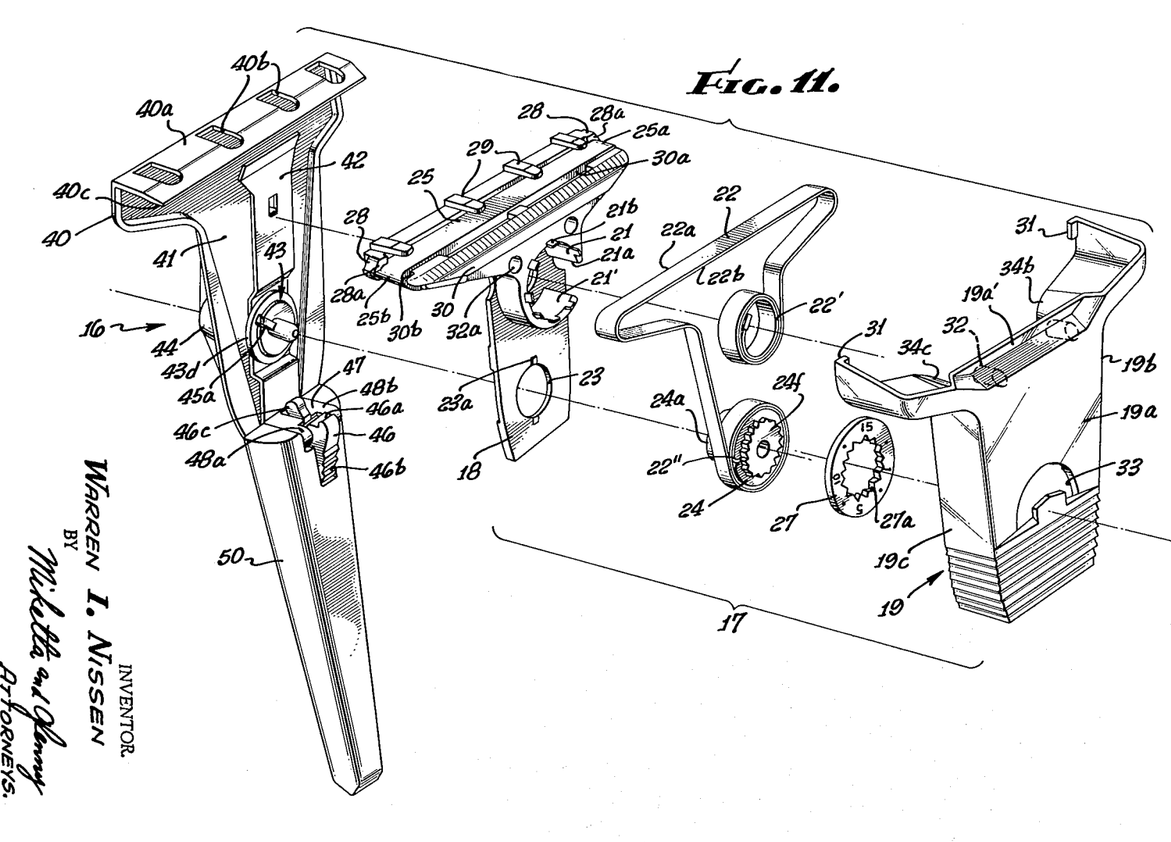
FIG. 11 is an exploded isometric view of a magazine device, as shown in FIGS. 1 to 10, a ribbon-like blade adapted to be carried and selectively positioned therein, and an exemplary holder in which such magazine may be mounted.

As best seen in FIG. 11, the exemplary magazine 17 of the present invention includes a base or back element 18 adapted to receive and support various elements and a cover element 19 which is adapted to be firmly secured to the base 18 as by means of snap-type connections, to enclose and retain such elements.

The base 18 includes a substantially cylindrical, hollow element 21 adapted to receive a coiled supply of a ribbon-like shaving blade (such as shown generally at 22), an opening 23 for rotatably and loosely receiving and mounting a take-up means 24 adapted to receive an end of the blade 22, and an elongated, flat, transversely extending portion 25 defining a shaving zone for a portion of the blade 22 which blade passes over a portion 25 in following a path of travel between supply element 21 and take-up means 24, as hereinafter described in greater detail.

The blade strip comprises a blade 22 adapted to be used in the magazine 17 which is of uniform width, with a longitudinally extending unsharpened rear edge 22a, a parallel sharpened front edge 22b, a coiled supply end 22', and a take-up end 22''.

Figure 10:
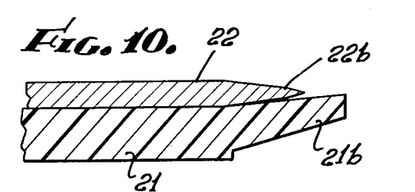
FIG. 10 is an enlarged section showing the relationship of the hollow supply element to the outer coil of the ribbon-like blade adapted to be received therein.

The hollow supply element 21 comprises a cylindrical inner wall 21' interrupted by an opening 21a at one side thereof through which the blade 22 extends from its supply end 22' which is adapted to be inserted within supply element 21 and a plurality of fingers 21b. The hollow supply element 21 has a total depth greater than the width of the blade 22 to insure that the sharpened edge 22b is protected from damage by contact with the cover 19, and to prevent the blade 22 from binding. The plurality of forwardly extending, spaced blade-retaining fingers 21b are provided on the outer portion and margin of the hollow supply element 21, the inner surfaces of the retaining fingers 21b being inclined toward the axis of the cylindrical supply element 21, as seen in FIG. 10. The angle of inclination of the inner surfaces of the fingers 21b is less than the angle of the bevel at the sharpened edge 22b of the blade 22, so that the retaining fingers 21b only contact the shoulder or bevel portion of the blade when the blade tends to ride outwardly. This avoids any contact with and possible damage to the ultimate shaving edge of the blade. The fingers 21b thus insure that the supply portion of blade 22 will be retained within the hollow supply element 21, since the tendency of the coil to expand causes it to readjust itself continuously to the size of the hollow supply element as the blade strip is fed out. The bottom of the hollow supply element 21 is planar and is adapted to contact the rear edge 22a of the coiled supply blade.

Blade take-up means 24 (FIGS. 3, 4, 5 and 11) comprises a rotatable arbor element 24' shown in cross section in FIG. 3 having a smaller diameter journal end 24a rotatably and loosely received in opening 23 formed in the base 18. The diameter of the opening 23 is greater than the diameter of journal end 24a of arbor 24' as best seen in FIG. 5 to allow the take-up means 24 to be self-adjustable on the base 18 when the blade 22 is subjected to tension. The rearwardly facing shoulder between the journal end 24a and the main portion of the arbor 24' is provided with a plurality of teeth 24b forming a continuous rack which is adapted to cooperate with and rotatably contact two or more fixed teeth 23a (FIG. 11) provided on the base 18 adjacent opening 23. Each of the teeth 24b and fixed teeth 23a (FIG. 3) has complementary inclined sliding surfaces terminating in mating stop surfaces to allow the arbor element 24' to only rotate in one direction (counterclockwise in FIG. 4) and thus keeping the blade 22 in continuous tension when it is wound on the take-up means 24. The cover element 19 is sufficiently flexible to permit the teeth 24b to pass over the fixed teeth 23a.

It is important that the take-up end 22'' be free to seek its own natural position on the arbor 24' since any restraint on its freedom to move laterally could very easily negate the effect produced by the combination of the inclined surface 34c and the frusto-conical form at the take-up end of the shaving zone keeping the blade strip moving along the desired path described. The angle of the inclined surface and height of the pad 28 at the take-up end are selected so that the blade end 22'' is free to coil up on the arbor 24' anywhere between the front surface of the base 18 and the indicia ring 27.

Figure 4:
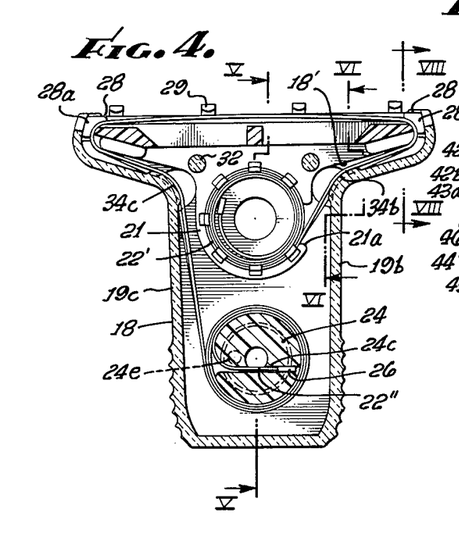
FIG. 4 is a front elevation of the magazine of FIG. 1, with the front wall of the cover removed and other parts broken away or removed for clarity.

Various means may be provided for securing the blade take-up end 22″ to the arbor 24′. For example, as best seen in FIGS. 4 and 5, the take-up end 22″ of the continuous ribbon-like blade 22 may be provided with an enlarged end 26 (of substantially greater thickness than the blade itself). The arbor 24′ may be provided with a transverse slot 24c facing toward the journal end 24a, such slot 24c having an enlarged end portion adapted to receive the enlarged end 26. When blade take-up end 22″ is placed in slot 24c with the enlarged end 26 in the enlarged portion of the slot, the blade is anchored to the arbor 24′ and cannot be withdrawn by a longitudinal pull on the blade. The enlarged end 26 at each end of the blade strip may conveniently be formed by spot welding a U-shaped clip thereto.

Means are provided whereby rotation may be imparted to arbor 24′ by any desired driving means. The arbor may be provided with a rearwardly opening axial bore 24d, adapted to receive a driving element. Bore 24d provides a convenient means for mounting the arbor 24′ on the driving element of a suitable holder. As illustrated, bore 24d may be cylindrical. The recessed end face 24g of arbor 24′ may be provided with a drive pin 24e adapted to engage an arm of a rotatable pin carried by a holder, whereby rotation of the pin results in rotation of the take-up means 24 to wind the blade up on the arbor 24′.

The other forward end of the arbor 24′ may be provided with a small pinion gear 24f adapted to engage and rotate an indicator ring 27 having indicia on the forward side thereof for indicating the number of shaving blade lengths remaining in the supply coil 22′. The inner surface of ring 27 is provided with gear teeth 27a, but the pitch diameter thereof is greater than that of pinion gear 24f. As best seen in FIGS. 1 and 5, the number of teeth 27a in ring 27 may be one or two more than the number of teeth on pinion 24f, so that the teeth mesh only along a portion of the periphery. Rotation of the arbor 24′ will cause the pinion 24f to drive the ring 27, but since the ring has more teeth than the pinion, it will be rotated a fraction less than one revolution each time pinion 24f is turned one revolution. Ring 27 is rotatably held within a suitable recess 33 formed in the rear face of the cover 19.

The rotatable arbor take-up means is therefore self-adjustably mounted on the base 18 within the magazine 17, and is adapted to move relative to the portion 25 (defining the shaving zone) when the blade take-up end 22″ is connected thereto, the arbor 24′ is rotated and the blade 22 is subjected to tension.

The magazine 17 includes path-defining means for a path of travel for the blade 22 between the supply element 21 and the take-up means 24. In general, the path-defining means (described in greater detail hereinafter) include means which properly position and maintain a portion of a long, ribbon-like blade in a shaving zone; means which provide a path of travel of reverse curvature; and means which so curve the blade and shift it laterally forward of a plane occupied by a collection of sharp edges in either the supply or the take-up or both elements by the application of take-up tension along the sharpened edge of the blade when the latter is clamped in the holder along such edge.

The aforesaid path-defining means includes an elongated flat portion defining a shaving zone portion 25 for a length of the blade 22 to be used for normal shaving. The shaving zone portion 25 has a substantially flat surface long enough to provide a support for a suitable length of the blade 22 for use in shaving and has a blade supply end 25a and blade take-up end 25b. Each of the ends 25a and 25b of the shaving zone 25 has a cylindrical surface of small radius the axis of which is substantially parallel with the axes of the supply element 21 and take-up means 24 (and in the illustrated embodiment perpendicular to the frontal surface of base 18). The ends 25a and 25b define a virtually semi-circular path of travel at ends of the shaving zone 25 for the blade 22. The radius of curvature of each end 25a and 25b may be on the order of about 0.06 inch about which the blade 22 is bent as it passes to and from the shaving zone 25. A path of travel of small radius, at the ends of the shaving zone, permits contouring the blade and magazine for effective shaving.

A pad 28 is provided at the supply end 25a and at the take-up end 25b of the shaving zone 25, the pads 28 being spaced from each other and having vertical frontal surfaces 28a in a plane substantially parallel to and spaced forwardly of the planes of the bottom surfaces of the supply element 21 and take-up element 24, which spacing may be in the order of 0.05 inch. The vertical pad surfaces 28a contact the unsharpened rear edge 22a at each end of the portion of the blade 22 within the shaving zone 25 to displace the sharpened blade edge 22b forwardly in such shaving zone. In the shaving zone 25 the area between the pads 28 is recessed so as to avoid undesirable contact with the rear edge 22a of the blade 22. This prevents any possible unevenness on the rear blade edge 22a from pushing or variably displacing the blade 22 forwardly. Due to the higher tension at the take-up end 25b during blade-advancing movements, there would be an undesirable tendency to rock or pivot the flat blade 22 about any protrusion thus causing the blade 22 to move forwardly and present an edge which is not in a desired shaving plane, or to be displaced at the supply end 22′.

The width of the shaving zone portion 25 from the pad surfaces 28a to the front longitudinal edge of portion 25 is less than the width of the blade 22. Therefore, the sharpened forward edge 22b of a blade fitted to the magazine is adapted to extend beyond the front edge of the portion 25 in the shaving zone into an effective shaving position.

A plurality of spaced blade hold-down elements 29 may be provided on the upper end of the base element 18, such elements 29 projecting forwardly and over the shaving zone portion 25 and spaced from it to permit the blade 22 to slidingly extend between elements 29 and portion 25. The elements 29 maintain blade 22 in a generally flat condition above the portion 25 when the magazine 17 is not mounted in the holder 16.

A guard 30 of conventional grooved or dentate configuration may be provided on the base element 18 slightly below and projecting forwardly of the shaving zone portion 25. The guard 30 is adapted to extend beneath the sharpened edge 22b of a length of the blade 22 positioned in the shaving zone. Debris removal slots 30a may be provided in the guard 30 and forwardly of the front edge of the shaving zone portion 25 to accommodate the removal of hair and debris accumulated during the shaving operation. An additional debris removal slot 30b may also be provided in the guard 30 adjacent and forwardly of the take-up end 25b of the shaving zone portion 25 to allow removal of any debris which may be accumulated at the take-up end of the shaving zone from the blade 22 being moved over such take-up end 25b.

Although all of the path-defining means could be integral with the base 18, the exemplary form of magazine illustrated here shows some of the path-defining means as a part of the cover 19. The cover 19 has the same general shape as the base element 18 and is adapted to be firmly secured thereto and cooperate therewith to enclose and/or retain the supply element 21, blade 22, take-up means 24, and indicator ring 27 to form the complete magazine 17. The cover may have a front wall 19a and rearwardly extending side walls 19b and 19c. Inwardly extending locking lugs 31 are provided on the rear edges of the side walls 19b and 19c and are adapted to be lockingly received in complementary recessed areas 31a provided in the rear surface of the base element 18. Similar locking lugs may be provided at different locations between base and cover. Resiliency of materials of construction permit the locking lugs 31 to snap into locking engagement with the recessed areas 31a to firmly secure the cover 19 on the base element 18. (See FIGS. 3 and 9.)

Dowel pins 32 extend rearwardly from the inside surface of the front wall 19a of the cover and are received in holes 32a provided in the base element 18. The cooperation of dowel pins 32 in the holes 32a insures proper registration and position of the cover element 19 on the base element 18 and aids in firmly securing these elements together to form a complete magazine 17.

The upper part of the recess 33 extends through the front wall 19a of the cover to allow the indicia on indicator ring 27 to be visible to the user of the magazine. There is therefore a visible indication of the number of shaving blade lengths remaining in the supply coil 22' enclosed within the magazine. The upper portion 19a' of the cover front wall 19a may be provided with an inwardly and upwardly inclined drainage surface adapted to extend below the debris removal slots 30a in the guard 30 when the cover 19 is firmly secured on the base element 18.

The cover element 19 of the magazine 17 includes means having surfaces inclined out of normal to the bottom surfaces of the supply elements 21 and take-up means 24, and positioned along the path of travel of the blade 22 between the supply element 21 and the supply end 25a of the shaving zone and its associated pad 28, and between the take-up means 24 and the take-up end 25b of the shaving zone and its associated pad 28. These means may be provided in the magazine on the inner surface of each of the side walls 19b and 19c of the cover and are shown at 34b and 34c, respectively.

Figure 6:
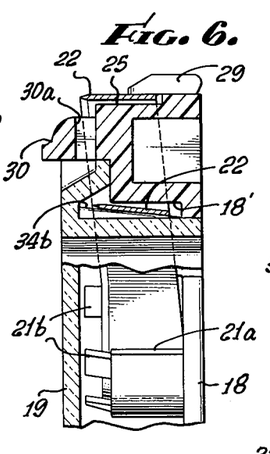
FIG. 6 is an enlarged vertical section of the upper portion of the device, taken along plane VI—VI of FIG. 4.

The inclined surfaces 34b and 34c in the magazine 17 lead and guide the blade 22 from the coiled blade supply 22' to the supply end 25a of the shaving zone, and from the take-up end 25b of the shaving zone to the take-up means 24. Each of the surfaces 34b and 34c is curved and inclined inwardly and rearwardly toward the base element 18, and both are adapted to provide a path of travel of reverse curvature for the blade 22 on either end of the shaving zone portion 25, as best seen in FIGS. 4 and 6. In the illustrated embodiment each of the inclined surfaces 34b and 34c may be at an angle of between 83° and 87° with the plane of the base element 18, but if the pads 28 are made higher, this angle may have to be made even smaller.

It can now be understood that means are provided in the magazine 17 which cooperate with the holder to impart a frusto-conical form to a portion of the blade 22 at each end of the blade length in the shaving zone 25. Such frusto-conical portions of the blade 22 are the resultant obtained by the relationship between the inclined surfaces 34b and 34c, the small, curved supply and take-up ends 25a and 25b of the shaving zone, and the forwardly spaced pads 28 adjacent the ends of the shaving zone when the blade is clamped along the sharpened edge by the holder. The frusto-conical form is indicated, in part, in FIGS. 7, 8 and 9.

When a ribbon-like blade 22 is properly assembled in the magazine 17 with the take-up end 22" connected to the take-up means 24, and the coiled supply end 22' positioned in the hollow supply element 21, and an intermediate length of the blade 22 properly tensioned over the shaving zone portion 25 and clamped thereto along the front edge of the blade, the blade 22 is twisted, bent and laterally displaced to form the frusto-conical shaving portions at the ends of the shaving zone. This can be understood by a detailed description of the positions adapted to be assumed by the blade 22 from its supply end 22' to its take-up end 22".

Figure 7:
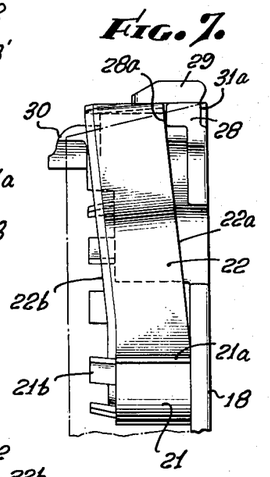
FIG. 7 is an enlarged fragmentary side elevation of the upper portion of the device shown in FIG. 4, the cover being removed.

As best seen in FIGS. 4, 6 and 7, the blade 22 extends through opening 21a of the supply element 21 and slidingly contacts the inclined surface 34b which imparts a twist to that portion of the blade 22. When rotation of arbor 24' places the blade under tension, the inclined surface 34b imparts increased tension to the sharpened forward edge 22b of the blade 22 and to also guide the rear edge 22a of the blade 22 onto the forwardly spaced, vertical surfaces 28a of the pads 28 in the shaving zone.

Figure 8:
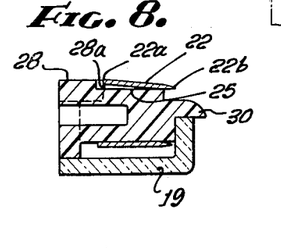
FIG. 8 is an enlarged vertical section taken along plane VIII—VIII of FIG. 4, illustrating the form and position of the blade at the end portion of the shaving zone.

That portion of the blade 22 extending between the inclined surface 34b and the supply end 25a of the shaving zone is therefore inclined until it contacts the under surface of the curved supply end 25a at which point it has a tendency to conform to such contacting surface (see FIG. 8). Due to the tension on the blade 22 from the take-up means 24, the blade is bent around the small radius of curvature of the supply end 25a of the shaving zone and tends to assume a substantially flat position between the flat surface of the shaving zone portion 25 and the blade hold-down elements 29. Due to the forwardly spaced surfaces 28a on the pad 28, the blade 22 in the shaving zone 25 is pushed forwardly so that the sharpened forward edge 22b is in a plane spaced forwardly of the leading edge areas 22b of those portions of the blade in the coiled supply end 22' and immediately preceding the supply end 25a of the shaving zone.

Figure 9:
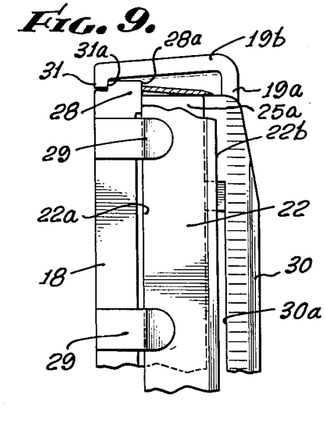
FIG. 9 is an enlarged fragmentary top plan view of the device, taken from plane IX—IX of FIG. 5, with a portion of the ribbon blade broken away.

However, as can be seen in FIGS. 7, 8 and 9, that portion of the blade 22 bent around the supply end 25a of the shaving zone has its rear edge 22a in contact with the pad surface 28a and is spaced from the upper rounded part of the supply end 25a and the adjacent portion of the shaving zone 25. That portion of the blade adjacent the sharpened forward edge 22b, due to the increased tension imparted thereto by the inclined surface 34b, tends to contact the forward edge of the supply end 25a. Therefore, the twists, curves and forward displacement imparted by the elements of the magazine to that portion of the blade at the supply end 25a of the shaving zone 25 produces in cooperation with the holder a frusto-conical form with the apex of the frusto-conical portion lying forwardly of the sharpened edge 22b of the blade 22, in effective shaving position. The frusto-conical form partly caused by the clamping force applied along the forward edge thereof by the holder will tend to cause the blade to back away into engagement with the pads 28.

When the magazine 17 is not removably mounted in the holder 16, the length of blade 22 extending over the shaving zone portion 25 may be slightly spaced therefrom but is retained in a substantially parallel position thereto by the blade hold-down elements 29.

That portion of the blade 22 extending from and around the take-up end 25b of the shaving zone also assumes a frusto-conical form similar to that portion of the blade 22 passing around the supply end 25a of the shaving zone, but the blade 22 tends to be bent and twisted in the reverse order to finally assume a coiled condition 22" around the take-up means 24.

As the blade 22 passes around the take-up end 25b of the shaving zone, the rear edge 22a is in contact with the pad surface 28a, and slightly spaced from the upper rounded part of the take-up end 25b. The portion of the blade adjacent the sharpened edge 22b of the blade tends to contact the forward edge of the take-up end portion 25b due to the increased tension imparted thereto by the inclined surface 34e. When the blade 22 is bent around and passes from the take-up end 25b, the blade is given a reverse twist by the inclined surface 34c. The rear edge 22a of that portion of the blade adjacent the inclined surface 34c is moved rearwardly toward the base element 18 and therefore tends to urge the rear edge 22a of the blade in contact with the pad surfaces 28a.

The magazine 17 is therefore provided to house a ribbon-like blade 22 of uniform width having a longitudinally straight rear edge and a parallel sharpened edge wherein successive portions of such blade 22 may be rendered available for shaving by rotating the take-up means 24. The base and cover of the magazine may be made of any desired metal or composition. Moldable organic plastic compositions of sufficient rigidity are preferred since the path-defining means, hollow supply container and interlocking connectors may be readily formed as integral parts of the base 18 and cover 19.

The blade 22 adapted to be used in the magazine 17 may be prepared by slitting from a sheet of suitable steel a ribbon-like strip which may be about 3/16 inch wide, and about 0.0015 inch thick. The strip, which preferably has a very smooth surface finish, is thoroughly cleaned and degreased, then plated with nickel by a conventional process, the plating having a thickness of about 0.0001 inch. The plated strip, after washing and drying, is hardened by heating above the critical temperature of the steel, then quenched and tempered to produce a strip having a Vickers hardness number of about 830. One longitudinal edge is sharpened to a razor edge whereupon the sharpened strip is cut into sections of a length depending on the number of shaving lengths desired. Anchor tips 26 are welded to both ends 22' and 22". Upon assembly of the blade 22 in the magazine 17, with the end 22" anchored in the slot 24e of the take-up arbor 24' and the other end 22' inserted in coiled form in the supply element 21, it is found that the blade can readily pass around both curved ends 25a and 25b of the shaving zone without fracturing or breaking despite the high hardness of the blade. When the blade is used up, the enlarged tip 26 on the supply end 22' will jam between the inclined surface 34b and the opposite surface 18' of the base 18 thus indicating to the user that the last shaving portion is in the razor.

Various forms of holders may be used to facilitate handling of the magazine during shaving. An exemplary holder 16 is shown in FIGS. 1, 2, 3 and 11 in which the magazine 17 of the present invention is adapted to be removably mounted so as to form a safety razor. The holder 16 may include at its upper end a head 40 having a forwardly projecting elongated lip 40a and a downwardly extending supporting web 41 rigidly connected at its lower end to a handle 50.

The lip 40a on the head 40 is provided with slots 40b adapted to receive, in mating relationship, hold-down elements 29 on the magazine 17 for positioning and insuring proper registration of the magazine 17 in the holder 16. The lip 40a extends continuously from one side of the head to the other side and has a substantially flat blade-engaging land surface 40c on the under side of the forward edge of the lip 40a.

As shown in FIG. 2, the land surface 40c on the lip 40a is adapted to engage and clamp the blade 22 downwardly into contact with the blade supporting surface portion 25 of the shaving zone of the magazine 17 so as to firmly clamp that portion of the blade 22 against the supporting surface in a flat shaving position. In addition, this clamping action on the blade in the shaving zone by land 40c of the lip 40a further develops and secures the frusto-conical end portions of the blade. That portion of the under surface of the lip 40a between the land surface 40c and the web 41 is recessed to allow sufficient space for the generation of the frusto-conical end portions of the blade.

An elongated magazine-guiding element 42 may be provided on the holder 16 and rigidly secured thereto by means of an extruded annular projection 42a extending through an aperture 41a in the web 41 and flared outwardly around the edges of the aperture 41a, as best seen in FIG. 3. An opening 42b within the annular projection 42a is therefore provided in the magazine-guiding element 42 for rotatably receiving a blade-advancing mechanism. Such blade-advancing mechanism includes a drive-pin carrier 43 journaled in opening 42b and having a shank end 43a extending through and rearwardly of the web 41. A crank arm or turnable lever 44 is firmly secured to the shank end 43a of the carrier 43, preferably by a press or friction-fit, to rotate the drive-pin carrier 43 and to secure such carrier on the head 40.

Drive-pin carrier 43, as best seen in FIG. 3, has a drive-pin 45 mounted for axial movement within a bore in the carrier 43, such drive-pin 45 has a laterally extending pawl 45a which projects outwardly through a slot 43b in the forward end 43c and flange 43d of the carrier 43. Drive-pin 45 is urged forwardly toward the carrier forward end 43c by a compression spring 46 which seats against the inner face of crank arm 44. The carrier forward end 43c is frictionally and securely received in bore 24d of the take-up means 24 and, when rotated by the crank arm 44, turns the arbor 24' to take up the used portions of the blade 22. The arbor 24' is therefore journaled on the holder 16 when the magazine 17 is mounted in the holder.

Pawl 45a drivingly engages the lug or pin 24e of the arbor 24' when the magazine 17 is mounted in the holder 16, and thereby provides an operative connection between the crank arm 44 and arbor 24' which may readily be engaged and disengaged when the magazine is mounted in or removed from the holder 16. The face 45a' of the pawl 45a is inclined so that if the crank arm 44 is turned in the wrong direction, the spring-loaded pawl 45a will simply ride up and over the rigid lug or pin 24e without rotating the arbor 24'. The slot 43b extends into shank end 43a to provide movement clearance for the pawl 45a. This prevents that portion of the blade 22 on arbor 24' from being forceably unwound. It is preferred that lug or pin 24e on the arbor 24' be weaker than pawl 45a so that when the blade tip 26 of the supply end jams in the magazine when the blade is used up as previously described, the lug or pin 24e, which is part of the replaceable magazine 17, will be broken rather than the blade strip 22 or the pawl 45 which is part of the holder 16.

In order to maintain the magazine securely in place when mounted in the holder 16, a snap-action latch 46 may be provided in the recessed area 50a in upper portion of the handle 50. The latch 46 is pivotally mounted about a shaft 47 bridging the hook members 48a and 48b (FIGS. 2 and 11) and received in a transverse recess 46d in the latch. The hook members 48a and 48b are integral with the lower end of the element 42 and are hooked over shoulders in the front of the handle to securely clamp the head 40 thereto. A compression spring 48 is seated in a socket provided in the handle recessed area 50a and bears against the bottom of latch 46 (FIG. 2) so as to maintain the latch 46 in the unlatched position as shown in FIG. 11 when the magazine 17 is removed from the holder 16. In the latched position shown in FIG. 2, the spring urges the latch upwardly and conformingly against the bottom portion of the magazine.

The latch 46 includes an upstanding locking ear 46a which engages the lower front portion of the magazine cover 19 when the magazine is mounted in the holder 16 and the latch is in the position shown in FIG. 2. Latch 46 also includes a thumbpiece 46b and a flat, rearwardly projecting cam 46c which bears against and engages the bottom wall of the magazine cover 19. The spring 48 bears against the latch 46 intermediate the locking ear 46a and the latch cam 46c. When the thumbpiece 46b is pressed inwardly, the cam 46c of the latch rocks against the contacting surface of the bottom of the magazine to move the locking ear 46a downwardly out of the path of the magazine 17 to permit the latter to be removed from the holder 16.

When the magazine 17 is mounted within the holder 16, the spring-pressed latch 46 biases the magazine upwardly toward lip 40a of the holder to clamp that length of the blade 22 in the shaving zone against the blade supporting portion 25.

A retaining or click element 49 may be mounted in a slot 51 of the holder web 41 (FIG. 2) and is adapted to be urged rearwardly and into engagement with a slot 44a in the crank arm 44 by integral laterally extending leaf springs 49a which bear against the rear surface of element 42. The retaining element 49 is held in a stationary position and cooperates with slot 44a to releasably hold the crank arm in a desired position and to indicate when the crank arm has rotated one complete revolution.

It will be apparent that additional magazines 17 may be provided, each identical in construction to the others and containing a fresh supply of ribbon-like blade 22 as replacements for the first magazine when the blade has been used up.

When the magazine 17 is mounted in the holder 16 a complete safety razor is provided wherein successive portions of the blade 22 may be rendered available for shaving by merely turning the crank arm 44. When the take-up means 24 is rotated to advance the blade 22, added tension is applied to the blade 22, thus causing a force to be applied from the take-up arbor 24', which is journaled to the holder 16, which force will tend to move the shaving zone portion 25 and the magazine 17 downwardly within the holder 16 to reduce the clamping pressure of the lip 40a against the blade 22. The unclamping action on the blade 22 in the shaving zone reduces the friction on the blade to permit it to be advanced freely.

A different embodiment of the present invention is shown in FIGS. 12 to 25, but it should be understood that any changes or improvements in the exemplary device in FIGS. 12 to 25 may be used in the device in FIGS. 1 to 11 and vice versa, whether used separately or in combination with all such changes or improvements.

For clarity and brevity, the elements in FIGS. 12 to 25 which are the same as the elements in FIGS. 1 to 11 will be identified with the same reference number plus 100. For example, the blade 22 in FIGS. 1 to 11 is the same as the blade in FIGS. 12 to 25, thus the blade in FIGS. 12 to 25 will be identified as 122 and has the same function as blade 22. New elements will be identified with a new reference number.

Figure 25:
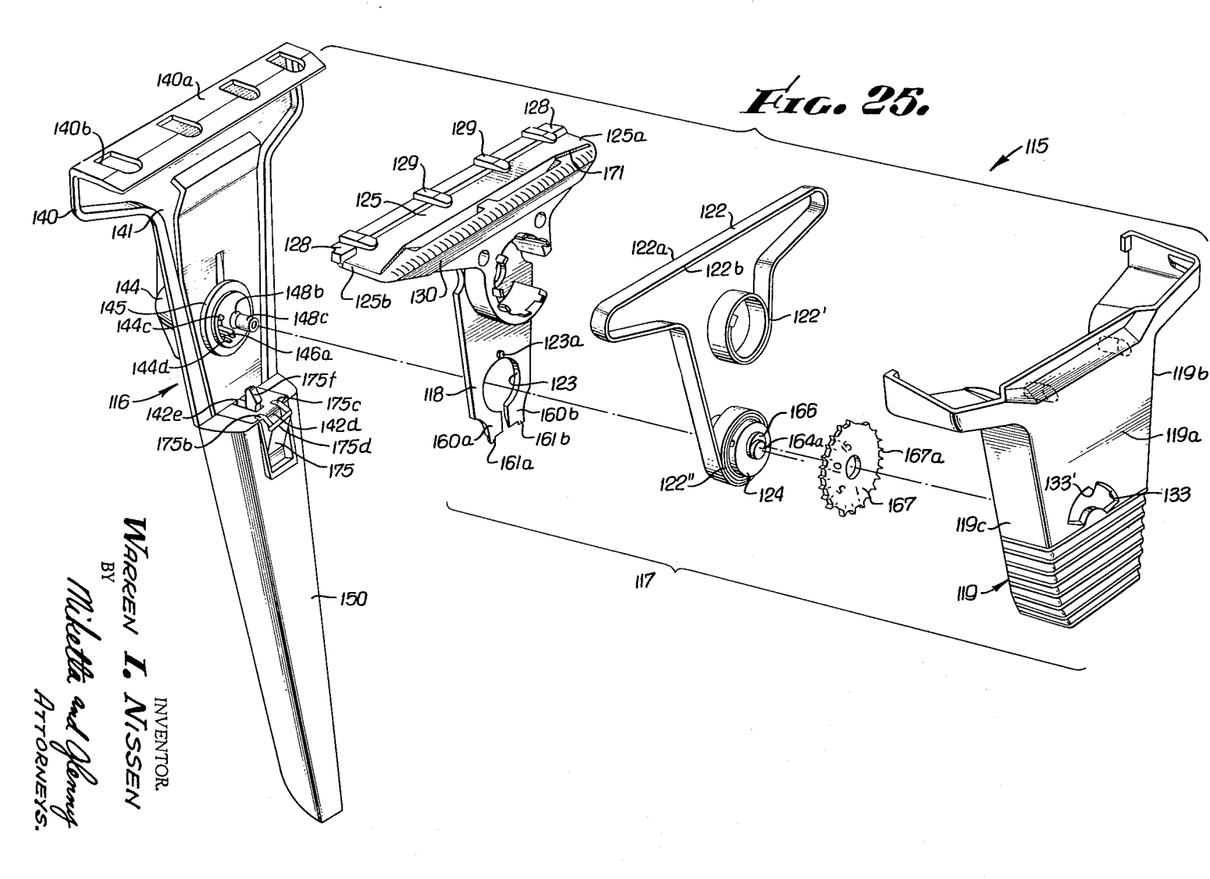
FIG. 25 is an exploded isometric view of the magazine device, as shown in FIGS. 12 to 24, a ribbon-like blade adapted to be carried and selectively positioned therein, and an exemplary holder, as shown in FIGS. 12, 13 and 14, in which such magazine may be assembled or mounted.

As seen in FIG. 25, there is shown a safety razor 115 in an exploded, unassembled condition for clarity and understanding including a holder 116 and an exemplary, different embodiment of a magazine 117 of the present invention removably carried by the holder 116.

Figure 20:
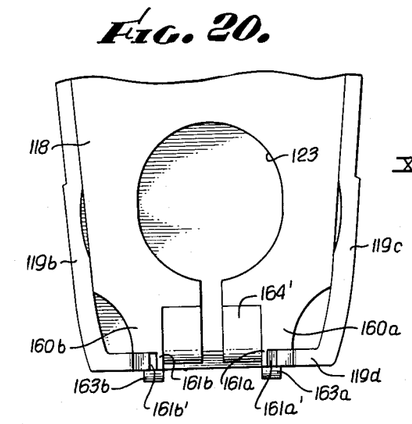
FIG. 20 is an enlarged fragmentary, rear elevation of the lower end portion of the magazine device of FIGS. 12 to 19.
Figure 21:
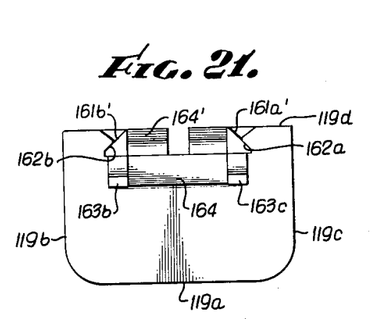
FIG. 21 is a bottom plan view of the magazine device of FIG. 20.

The exemplary magazine 117 includes a base or rack element 118 adapted to receive and support various elements and a cover element 119 which is adapted to be firmly secured to the base 118 by various connections, to enclose and retain such elements. The lower portion of base 118 may be longitudinally split from opening 123 to the lower end base 118 to provide a pair of flexible arm portions 160a and 160b, each of which has a downwardly extending, connecting finger element 161a and 161b, respectively. The finger elements 161a and 161b are spaced apart and are provided with outwardly inclined surfaces 161a' and 161b' on the rear surfaces thereof (FIGS. 20 and 21) for mating with complementary inclined surfaces 162a and 162b provided in the rearwardly extending lower wall 119d of cover 119 to provide a dovetail connection between the base 118 and cover 119.

Figure 16:
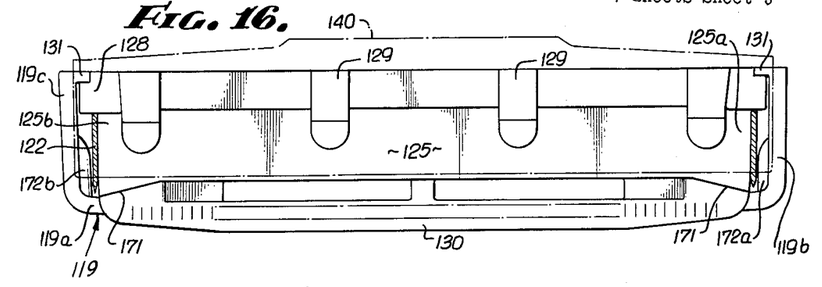
FIG. 16 is an enlarged top plan view, partly in section, of the magazine device of FIGS. 12 and 13 in the assembled position when secured within a holder, a holder being shown in phantom lines.
Figure 17:
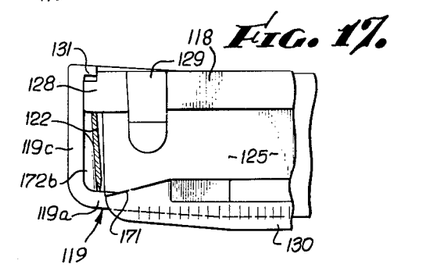
FIG. 17 is an enlarged fragmentary top plan view, partly in section, of the magazine device of FIG. 16, except the device is in a slightly bowed and unassembled position with respect to a holder.

This dovetail connection (160, 161 and 162) together with locking lugs 131 (FIGS. 16 and 17) provided at different locations between the base and cover firmly secure cover 119 on the base 118. It should be understood that only one fixed tooth 123a is provided on the base 118 as distinguished from the two teeth 23a on base 18. In either embodiment, one tooth is sufficient to perform the function and cooperation with the arbor element 24' or 124'.

The outer surface of the lower wall 119d of cover 119 may be provided with downwardly extending, spaced lugs 163a and 163b, preferably rounded, which are adapted to cooperate with the snap-action latch 146 to aid in ejecting a used magazine 117 from the holder 116, as will be described in greater detail hereinafter.

Figure 22:
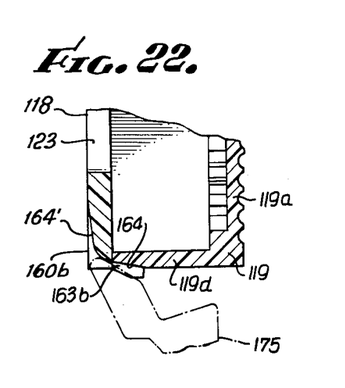
FIG. 22 is a fragmentary vertical section of the lower end of the magazine device of FIGS. 20 and 21, the latch element of a holder being shown in phantom lines and illustrating its cooperation with the camming surface on the bottom of the magazine device.

A rearwardly and upwardly inclined camming surface 164 (FIGS. 20, 21 and 22) may be provided on the outer surface of lower wall 119d of cover 119, such camming surface 164 may be continued and provided on the lower end of base 118 as camming surface 164'. When base 118 and cover 119 are assembled, camming surfaces 164 and 164' cooperate together with the latch 146 to also aid in ejecting a used magazine 117 from holder 116 in accordance with the description that follows.

Figures 14, 15:
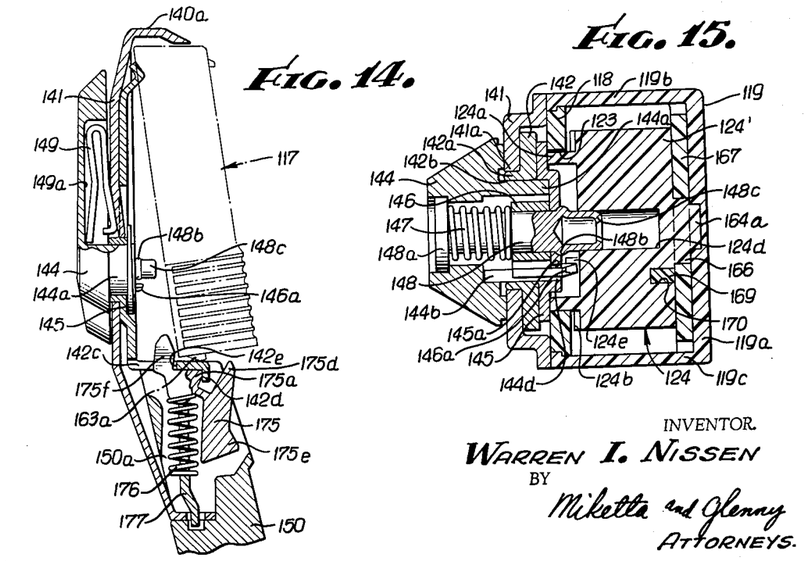
FIG. 14 is a vertical section of the holder of FIGS. 12 and 13 with the latch in the ejected or unassembled magazine position, a magazine in phantom lines being shown in the unassembled position.
FIG. 15 is a transverse section of the device taken along plane XV—XV of FIG. 12.
Figure 18:
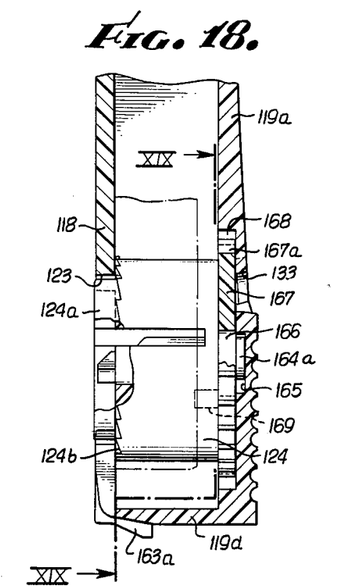
FIG. 18 is an enlarged fragmentary, vertical section of the magazine device of FIGS. 12 and 13 and particularly shows a modified counting or indicia means for indicating the number of unused shaving lengths of the blade that remain.

Blade take-up means 124 (FIGS. 15, 18 and 25) comprises a rotatable arbor element 124' shown in cross section in FIG. 15 having a smaller diameter journal end 124a rotatably and loosely received in opening 123 in base 118. The loose and rotatable connection between arbor 124' and base 118 allows the take-up means 124 to be self-adjustable on base 118 when the blade 122 is subjected to tension. The continuous rack of teeth 124b on the shoulder between the arbor journal end 124a and arbor 124' is adapted to cooperate with fixed tooth 123a on base 118 to only allow arbor element 124' to rotate in one direction and therefore maintain blade 122 under continuous tension when wound on take-up means 124.

A drive pin 124e may also be provided on arbor 124' and is adapted to engage an arm of a rotatable pin carried by holder 116, whereby rotation of the pin results in rotation of take-up means 124 to wind blade 122 on arbor 124'.

The other forward end of the arbor 124' may be provided with a smaller diameter, forwardly extending pin 164a centrally located along the horizontal axis of arbor 124'. Pin 164a is journaled and received in a recess 165 (FIGS. 15 and 18) provided in the inner surface of the front wall 119a of cover 119. The recess 165 is elongated in the vertical direction (FIG. 18) to permit the arbor 124' to move a limited distance vertically.

Figure 19:
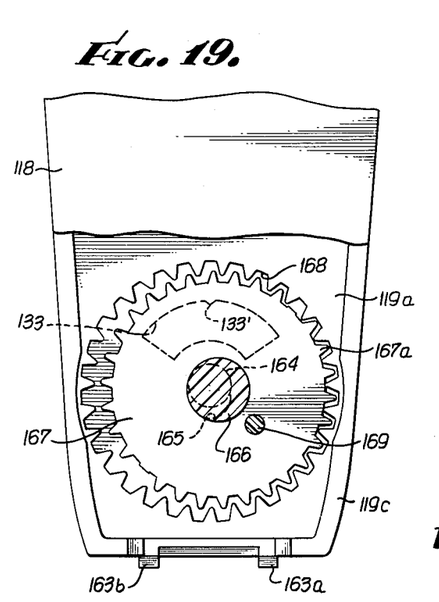
FIG. 19 is a transverse section of the device taken along plane XIX—XIX of FIG. 18.

An eccentric 166 is provided on the forward portion of arbor 124' just rearwardly of pin 164a. An indicator ring or dial 167 having indicia indicating the number of shaving blade lengths remaining in supply coil 122' is rotatably mounted on the eccentric 166. The indicator ring or dial 167 may include outer gear teeth 167a which are adapted to engage and function with a stationary ring gear having teeth 168 (FIGS. 18 and 19) on the inner surface of the front wall 119a of cover 119, such ring gear surrounding the recess 165 and window 133 in the front cover wall 119a. The outer, stationary ring gear 168 includes more teeth than the ring or dial gear teeth 167a, for example, 31 teeth may be provided in the stationary ring gear 168 and 30 teeth in the ring gear teeth 167a.

As the arbor 124' is rotated, the eccentric 166 drives the indicator ring or dial 167. Since the outer gear teeth 168 are stationary and have at least one more tooth than are in the inner ring 167, the indicator ring 167 will be eccentrically moved and will rotate only one tooth for each complete revolution or rotation of arbor 124'. As best seen in FIG. 25, a division or number of the indicia on the face of indicator ring 167, may be located at each tooth. Therefore, one complete revolution of arbor 124' will result in a movement of one number or division of the indicia on indicator ring 167.

This modified counting mechanism for the number of unused blade shaving lengths only requires a smaller viewing window 133 in cover 119 than as shown in FIG. 11. A pointer 133' may be provided on window 133 to indicate the actual number or division of the indicia on ring 167 that corresponds to the number of unused blade shaving lengths.

The indicator ring or dial 167 may also be provided with a locating stud or pin 169 extending rearwardly and received in a hole 170 in the front face of arbor 124'. During assembly, the ring 167 is held in position on the arbor eccentric 166 by pin 169 in hole 170. When assembly of the entire magazine 117 is completed, the blade take-up means 124 is moved a quarter of a turn to tighten the blade 122 and the pin 169 is sheared off along the plane of the rear surface of indicator ring 167 due to the engagement of gear teeth 167a and 168. After pin 169 has been sheared off of ring 167, the arbor 124' and indicator ring 167 cooperate together in the manner described hereinabove.

Means may be provided adjacent the take-up end 125b of the shaving zone portion 125 and below the shaving zone portion 125 for preventing debris from accumulating between the blade 122 and the curved take-up end 125b when the blade 122 is moved across the shaving zone.

Such means may include a vertical face 171 extending at an angle with the horizontal and the shaving zone 125 and extending outwardly from the curved take-up end 125b.

When the magazine 117 is disassembled from holder 116 and the blade 122 is untensioned, it is desirable to limit the outward bowing of the blade 122 in the magazine 117. Means may be provided adjacent to and spaced from each curved end surface 125a and 125b of the shaving zone to limit such blade bowing. Such means may include internal shoulders 172a and 172b provided on the inner surface of cover 119, such shoulders 172a and 172b extending inwardly toward but spaced from each of the ends 125a and 125b of the shaving zone 125.

When the magazine 117 is disassembled from the holder 116, and is in a non-shaving position, the front wall 119a of cover 119 may be bowed rearwardly (FIG. 17) so as to extend behind the back surface of the base 118. In this position, the forward sharpened edge 122b of blade 122 engages the inner surface of front cover wall 119a to force the blade 122 against the pads 128 at each end of the shaving zone 125 when the magazine 117 is separated from holder 116. When the magazine 117 is clamped in or assembled with the holder 116 (FIG. 16), the rearwardly extending side portions of the cover 119 will engage the holder 116 and will be pushed forwardly into the same plane as the rear surface of the base 118. The cover 119 will therefore release the blade 122 as soon as magazine 117 is snapped into the holder 116 and before the blade is ready to be advanced.

The rearward bowing of the cover 119 always assures that the initial length of blade 122 in the shaving zone 125 will be disposed against the pads 128 and will have the correct blade exposure. There will be no spacing between the rear edge 122a of the blade 122 and pads 128 at any time. It is understood that as soon as tension is applied to the blade 122 by the take-up means 124, the blade will continuously be urged into contact with pads 128.

Another embodiment of an exemplary holder that may be used with the magazines of the present invention is indicated as 116 and also includes at its upper end a head 140 having a forwardly projecting elongated lip 140a and a downwardly extending supporting web 141 rigidly connected at its lower end to a handle 150.

Figure 23:
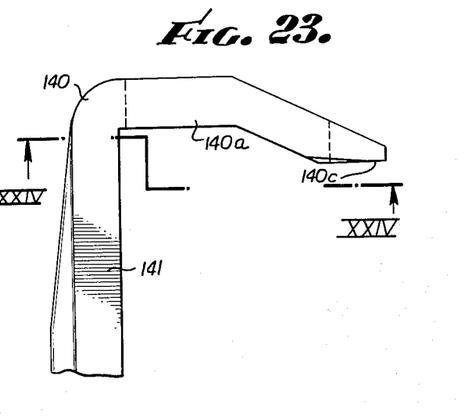
FIG. 23 is an enlarged, fragmentary, end elevation of the upper portion or lip of the holder device of FIGS. 12, 13 and 14 with the magazine removed or unassembled.

The lip 140a includes a blade engaging land surface 140c (FIGS. 23 and 24) on the under surface of the forward edge thereof, such surface 140c adapted to engage and clamp the blade 122 downwardly into contact with the blade supporting surface 125 of the shaving zone.

Figure 24:
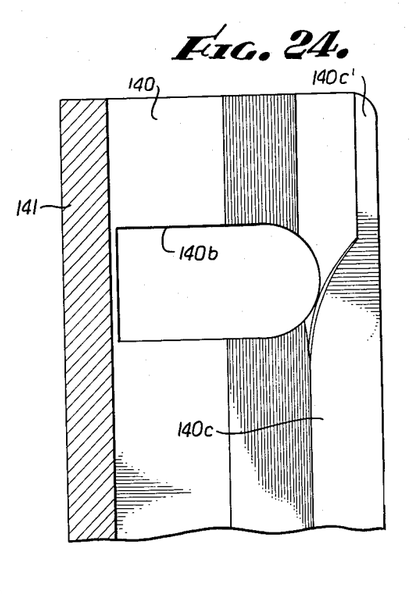
FIG. 24 is a transverse section of the underside of the lip of the holder device taken along plane XXIV—XXIV of FIG. 23.

The under surface 140c of holder lip 140a may include a wider center clamping surface 140c′ for contacting the blade 122 and a narrower surface 140c″ adjacent each end of lip 140a (FIG. 24). The wider clamping surface 140c′ serves to hold the blade 122 more rigidly against the blade supporting surface 125 and the narrower under surface 140c″ at each end of lip 140a does not interfere with the bowing of the blade 122 around the curved ends 125a and 125b of shaving zone 125.

An elongated magazine-guiding element 142 may be provided on holder 116 and rigidly secured thereto by means of an extruded annular projection 142a extending through an aperture 141a in the web 141 and flared outwardly around the edges of the aperture 141a, as best seen in FIG. 15. An opening 142b within the annular projection 142a is therefore provided in the element 142 for rotatably receiving a blade-advancing mechanism.

Such blade-advancing mechanism may include a crank arm or turnable lever 144 having a hollow forwardly extending hub portion 144a rotatably and snugly received in opening 142b. Hub portion 144a extends slightly beyond and forwardly of magazine-guiding element 142 to provide a seat for a retaining disc 145. An elongated axially extending slot 144b is provided in hub portion 144a and axial, spaced locating projections 144c and 144d (FIGS. 15 and 25) are also provided on the forward end of hub portion 144a on either side of the axial slot 144b.

The retaining disc 145 includes an arcuate groove 145a which receives the projections 144c and 144d at the ends of such arcuate groove 145a to locate the retaining disc 145 on the holder.

An axially movable pawl 146 is positioned within the hollow hub portion 144a and is biased forwardly against the retaining disc 145 by a coiled spring 147. A forwardly extending drive element 146a on the pawl 146 is adapted to project through the arcuate groove 145a in retaining disc 145 and is adapted to engage drive pin 124e affixed to the arbor 124′. The drive element 146a on pawl 146 has a sloping camming surface whose lower end terminates at or slightly below the surface of retaining disc 145 when the pawl 146 is biased forwardly against disc 145 as shown in FIG. 15 to allow the drive pin 124e on arbor 124′ to ride smoothly over pawl 146 when lever 144 is turned in a reverse direction. A center pin 148 passes through lever 144, pawl 146, retaining disc 145 to retain all of the blade-advancing elements in an assembled position on holder 116. The outer end of pin 148 is provided with a head 148a which is received in a recess in lever 144 and which retains the outer end of the spring 147 that biases pawl 146 forwardly. The pin 148 is provided with an intermediate upset collar 148b that engages the inner surface of retaining disc 145 and serves to retain all of the blade-advancing elements in assembled and operative position in holder 116.

The forward end 148c of pin 148 is adapted to be received in the central recess 124d in arbor 124′ and serves as a journal or center for the arbor 124′.

A U-shaped click spring 149 may be carried by a recess 149a in the lever 144 (FIG. 14) and is adapted to continuously bear against and ride over the back of the web 141 of holder head 140. The spring 149 therefore moves with lever 144 upon each revolution of lever 144 when a new blade length is provided in shaving zone 125.

A slightly modified snap-action latch 175 may be used on holder 116 to securely maintain the magazine 117 in assembled position on holder 116. A recessed area 150a (FIG. 14) in the upper portion of handle 150 receives latch 175 which is pivotally mounted about a horizontally extending shaft portion 175a projecting between upstanding shoulders 175b and 175c, all of which may be integral with latch 175. The lower, horizontal portion 142c of element 142 extends forwardly over recessed area 150a and includes a downwardly projecting bearing hook member 142d which loosely and rotatably receives shaft portion 175a.

Figure 12:
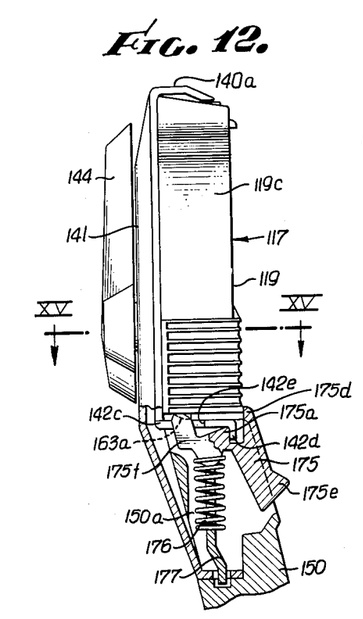
FIG. 12 is a side elevation, partly in vertical section, of another embodiment of the device of the present invention, with the magazine assembled in a holder.
Figure 13:
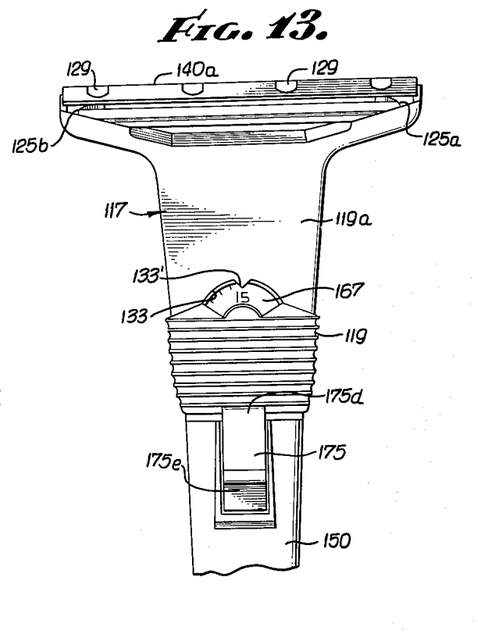
FIG. 13 is a front elevation of the assembled magazine device and holder of FIG. 12.

The latch 175 includes an upstanding locking ear 175d which engages the lower front portion of magazine cover 119 when the magazine is mounted in the holder 116 (FIG. 12). Latch 175 also includes a thumbpiece 175e and rearwardly projecting cam element 175f which extends upwardly and is adapted to move through opening 142e in lower portion 142c of element 142.

A vertical compression spring 176 may be provided in recess area 150a for urging the shaft portion 175a of latch 175 upwardly into operative pivotal engagement with hook member 142d. The lower end of spring 176 may be carried by a vertical spring guide and retainer 177 secured to the handle 150 within recessed area 150a. The upper end of spring 176 is urged upwardly into continuous contact against the bottom of latch 175 (FIG. 14) intermediate the locking ear 175d and cam element 175f. The spring 176 is adapted to be moved between a latched position (FIG. 12) and an unlatched position (FIG. 14) and in each position is adapted to maintain latch 175 in an over-center position with respect to the vertical spring 176 and guide element 177.

To assemble the magazine 117 on the holder 116, the upper end of magazine 117 is positioned beneath lip 140a and the lower end of the magazine is pushed inwardly causing the latch 175 to pivot into the latched position of FIG. 12.

When it is desired to remove magazine 117 from holder 116, the thumbpiece 175e is pressed inwardly, the cam 175f of the latch engages the camming surfaces 164 and 164' on magazine 117 causing the magazine to cam forwardly and be ejected into the unlatched position of FIG. 14. In this position, the upstanding latch shoulders 175b and 175c engage the spaced lugs 163a and 163b which extend downwardly from magazine 117 to hold the magazine 117 in this ejected position until manually removed.

The upper end of magazine-guiding element 142 may be rolled over to present a smooth surface for engaging the rear surface of magazine 117 (FIG. 25) to prevent interference with the magazine when being removed from the holder 116.

It is understood that the modification or different embodiments of the elements or parts in the magazine 117 and holder 116 may be used or incorporated, separately or in combinations, in the magazine 17 and holder 16, or vice versa, without deviating from the present invention.

Obviously, many modifications and variations of the present invention are possible in the light of the above teachings. It is therefore to be understood that within the scope of the appended claims the invention may be practiced otherwise than as specifically described.

I claim:
1. A method of isolating and effectively rendering a portion of ribbon-like shaving blade of uniform width available for adjustment into effective shaving position while maintaining the major sections of said ribbon-like blade restrained in supply and take-up coil forms, comprising:
positioning a supply coil of ribbon-like blade and its take-up end portion with the rear edges of said blade lying in substantially parallel and virtually coplanar planes;
placing a portion of such ribbon-like blade intermediate the take-up and supply coil sections thereof, with the rear edge of such intermediate portion in a plane parallel to but spaced in advance of said planes;
and isolating such intermediate portion from said supply and take-up sections by imparting an angular twist to said ribbon-like blade in zones beyond said intermediate portion, thereby confining the stress in tension in the intermediate portion along the sharpened edge thereof.

2. A method as stated in claim 1, including the steps of:
forming cone-shaped portions at the ends of said intermediate portion of said blade with the apex of each of the cones forward of the sharpened edge of the blade by bending the blade about a radius less than half the width of the blade and simultaneously twisting the blade at a zone removed from said cone-shaped portions to impart increased tension to areas adjacent the sharpened edge.

3. A method of effectively guiding a ribbon-like shaving blade of uniform width through a shaving zone of a magazine adapted to be placed in a holder, so as to maintain the unsharpened rear edge of the blade at all times against an abutment surface associated with said shaving zone while maintaining major sections of said ribbon-like blade restrained in supply and take-up zones comprising:
positioning a ribbon-like blade in said shaving zone between a blade supply zone and a blade take-up zone;
displacing the portion of such ribbon-like blade in said shaving zone, with the rear edge of such portion of said blade spaced forwardly of the rear edges of such blade in said supply and take-up zones and imparting an angular twist to the ribbon-like blade in zones adjacent each side of said blade portion in said shaving zone.

4. A method as stated in claim 3 including the steps of:
forming cone-shaped portions at the ends of said portion of such blade with the apex of each of the cones forward of the sharpened edge of the blade by bending the blade about a radius less than half the width of the blade to impart increased tension to the sharpened edge of the blade.

No references cited.

GRANVILLE Y. CUSTER, JR, *Primary Examiner.*